Dec. 25, 1962 H. E. W. BODE 3,069,956

ELECTRONIC APPARATUS

Filed April 21, 1960 2 Sheets-Sheet 1

Dec. 25, 1962

H. E. W. BODE

ELECTRONIC APPARATUS 3,069,956

Filed April 21, 1960

2 Sheets-Sheet 2

3,069,956

ELECTRONIC APPARATUS

Harald E. W. Bode, West Brattleboro, Vt.
(1344 Abington Place, North Tonawanda, N.Y.)

Filed Apr. 21, 1960, Ser. No. 23,712
6 Claims. (Cl. 84—1.24)

Figure 1:
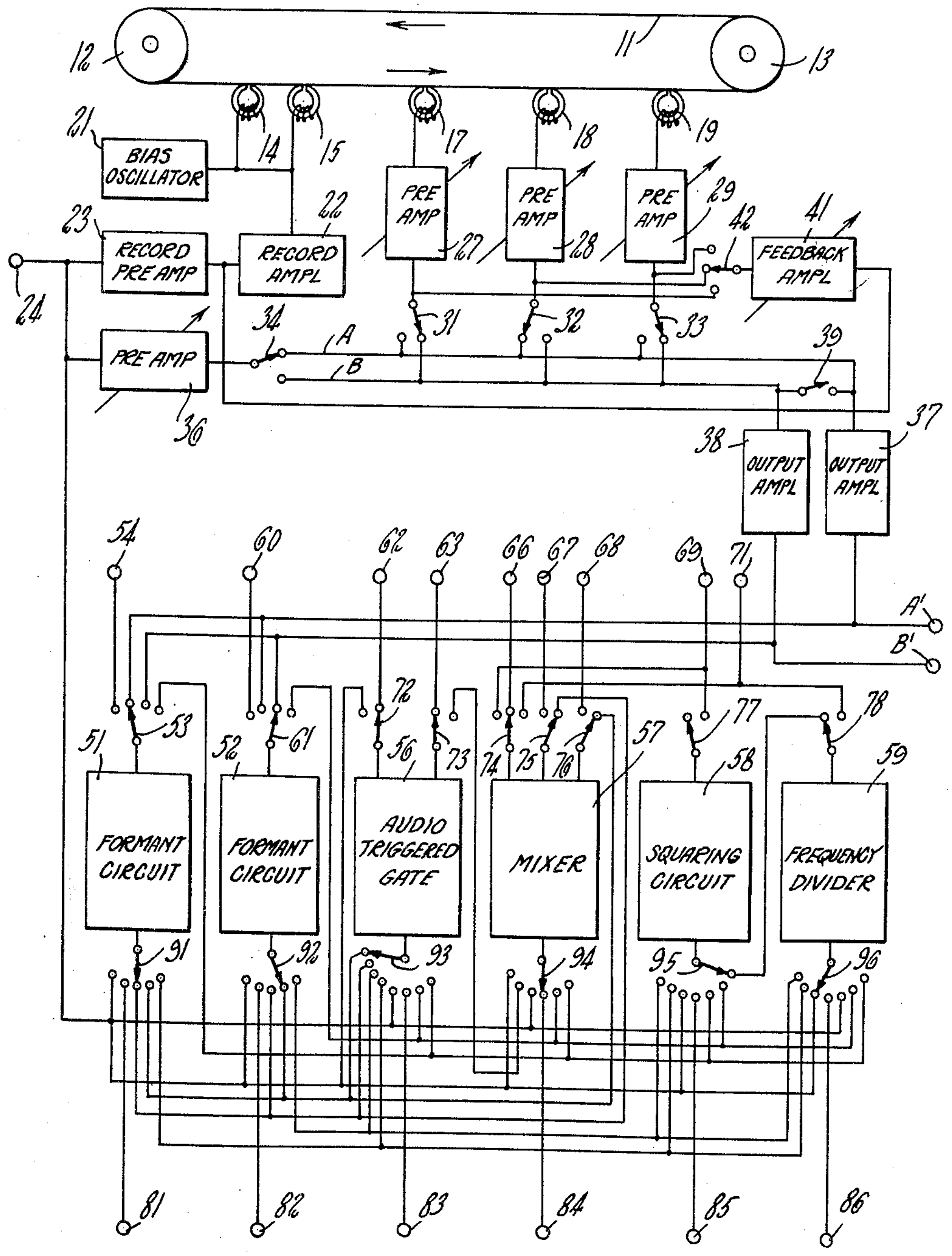

This invention relates generally to electronic apparatus for producing special musical effects, and in particular it is concerned with the combination of apparatus for producing reverberations with tone-shaping devices of various kinds.

An object of the invention is to provide apparatus which is capable of producing a wide variety of musical effects interchangeably, and yet does not require highly complex electronic circuitry.

Another object is to make the apparatus easy to use so that its full capabilities can be realized without special knowledge or training.

Still another object is to provide highly compact apparatus of the above-mentioned character.

The novel features of the invention together with further objects and advantages thereof will become apparent from the following detailed description and the drawing to which it refers.

Figure 2:
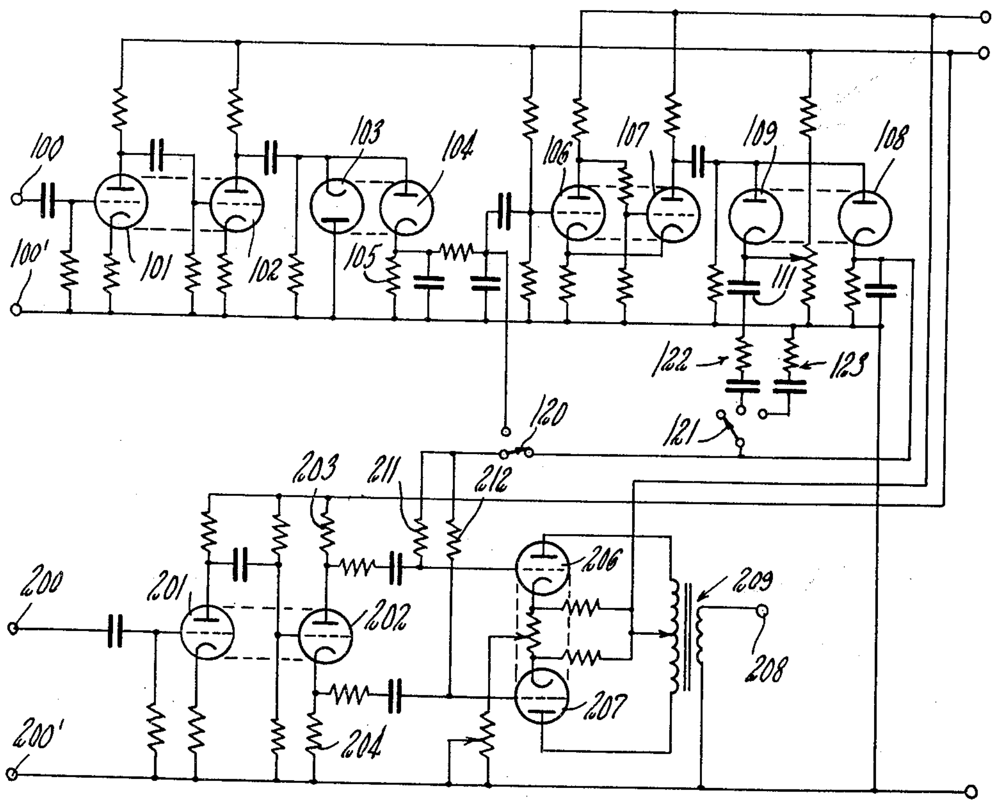

In the drawing:

FIG. 1 is a block schematic diagram of the apparatus according to the present invention, and FIG. 2 is a schematic diagram of the audio triggered gate circuitry illustrated in block form in FIG. 1.

With reference now to the drawing it will be observed that the numeral 11 represents an endless magnetic tape which is transported in a loop by drums 12 and 13. Drum 12 is driven in a conventional manner to produce counter-clockwise rotation of the loop, at a speed such as fifteen inches per second by way of example. Associated with one of the traverses of the tape between the two drums are erase head 14 and record head 15 and play-back heads 17—19. Erase head 14 is directly connected to a bias oscillator 21 for erasing signals from the tape, and record head 15 is connected to the output of a record amplifier 22. The input to record amplifier is provided by a record pre-amplifier 23 to which is applied by way of a terminal 24 the music or musical tones to be operated upon by the apparatus of the invention.

Connected to play-back heads 17—19 are pre-amplifiers 27—29, respectively, each of which is adapted to be selectively connected to one of two output lines A and B by means of switches 31, 32 and 33, respectively. That is to say, each switch has a selector arm which is connected to its corresponding pre-amplifier output, and each switch has a pair of taps individually connected to the lines A, B. Also adapted for connection to the input ends of these lines through a selector switch 34 is the output of a pre-amplifier 36 which derives its input directly from terminal 24. A pair of output amplifiers 37 and 38 are connected to the opposite or output ends of the lines A, B respectively, and the outputs of these amplifiers are connected to a pair of output terminals designated A′ and B′. In addition, a switch 39 is provided optionally to interconnect the inputs to the amplifiers 37, 38 and there is a feed-back amplifier 41 whereby signals derived from a selected one of the play-back heads 17—19 can be rerecorded by means of record head 15. Feed-back amplifier 41 has its input connected to the movable arm of a selector switch 42 having three taps. One of these taps is connected to pre-amplifier 27, another to pre-amplifier 28, and the other to pre-amplifier 29. The output of feed-back amplifier 41 is connected directly to the input of the record amplifier 22.

Also adapted to be connected to output terminals A′ and B′ are a pair of formant circuits 51 and 52. More particularly, the input of formant circuit 51 is connected to the movable arm of a selector switch 53 which has four taps. The first of these taps, that is the one which precedes the others of the group, proceeding in a clockwise direction, is connected to an input terminal 54; the second tap is connected to output terminal A′; the third tap is connected to output terminal B′, and the fourth tap, by means of various other switches to be described in detail hereinafter, is adapted to be selectively connected to additional circuits which are illustrated in block form in like manner as formant circuits 51 and 52. These additional circuits are seen to comprise an audio triggered gate 56, a mixer 57, a squaring circuit 58, and a frequency divider 59. Connected to the input of formant circuit 52 is the movable arm of a selector switch 61 which has four taps with connections that are similar to those of the switch 53 associated with formant circuit 51. These include a connection to the input terminal 60 for formant circuit 52.

The audio triggered gate 56 has a pair of input terminals 62, 63, one for the signal to be triggered and the other for the triggering signal, and the mixer 57 has three input terminals 66, 67 and 68. The squaring circuit and the frequency divider have one input terminal each, designated 69 and 71, respectively. The gate input terminal 62 is connected to the second tap of a selector switch 72 which has its movable arm connected to one of the two input circuits of the gate. In a similar manner, terminal 63 is adapted to be connected to the other input circuit of the gate circuit by means of a selector switch 73. The input terminals 66, 67 and 68 for the mixer are connectable to corresponding mixer input circuits by means of selector switches 74, 75 and 76. Selector switch 74 has three taps, and selector switch 75 has two taps, as does selector switch 76. The first tap of switch 74 is connected to the input terminal 69 for the squaring circuit 58. The second tap is connected to the mixer input terminal 66, and the third tap is connected to the input terminal 71 for the frequency divider 59. Switches 75 and 76 each have their first taps connected to the respective mixer input terminals 67 and 68. Finally, it will be observed that there are provided selector switches 77, 78 to selectively connect the squaring and frequency divider circuits to their respective input terminals 69, 71.

With reference now to the output sides of the formant circuits, the gate circuit, the mixer, the squaring circuit, and the frequency divider, it will be observed that each has an output terminal associated with it, the same being designated 81 through 86, and each has a selector switch for making connections to the output terminals, the same being designated 91 through 96. In addition, each of these selector switches has a tap which is connected to the input terminal 24; selector switches 93—96 each has a tap which is connected to the fourth tap of selector switch 53 for formant circuit 51, and a tap which is connected to the fourth tap of the switch 61 for the formant circuit 52. Another tap on each of the switches 91—96 is connected to the first tap of the switch 72 associated with the audio triggered gate 56. Still another pair of taps of switches 91—93 are connected to the respective second taps of the switches 75 and 76 for the mixer 57. Finally, there is a connection between second tap of the mixer output switch 94 and the second tap of the gate circuit input switch 73, and a connection between the last tap on the output switch 95 for the squaring circuit and the first tap of the input switch 78 for the frequency divider.

In FIG. 2 the design of the audio triggered gate is shown in detail. From FIG. 2 it will be observed that numerals 101 and 102 refer to the two halves of a dual triode arranged to provide two stages of amplification for triggering signals applied by way of the terminals 100—100′. The output of the amplifier stages is in turn capacitively coupled to a parallel rectifier circuit which embodies a double diode electron tube in a half wave detector arrangement. That is to say, the diodes 103, 104 are disposed in parallel relation across the output of the amplifying circuit with their polarities opposite to one another, the rectified triggering signal appearing across a load resistor 105 disposed in series with one only of the diode sections, namely section 104.

The rectified triggering signal is next applied to a monostable pulse generating circuit generally known to those skilled in the art as a Schmitt trigger circuit. This circuit is formed with dual triode sections 106 and 107, the latter providing the pulse output. As there are produced both a positive and a negative pulse each time the circuit is triggered, it is a function of a diode 108 to pass only the positive pulses. These appear across the load resistor for the diode 108 which is seen to comprise one-half of a dual diode electron tube, the other half 109 of which serves as a clipper. That is to say, there is a capacitor 111 in series with the diode section or half 109 which serves to regulate the level of the pulses that appear across the load circuit of the diode section 108.

The audio signals, which are to be gated on in response to the triggering signals, can be obtained directly from an electronic musical instrument or by way of a microphone or some other optional form of transducer. These signals are applied to a pair of terminals 200—200′ which comprise the input terminals to a single stage amplifier. This amplifier stage is formed with one section of a dual triode 201, 202, the other half of which is arranged as a conventional phase splitter. That is to say, the load circuit of section 202 comprises an anode resistor 203 and a cathode resistor 204 of substantially the same value from which output signals of opposite phase are derived. These are applied to a push-pull amplifier comprising dual triode sections 206 and 207 which are coupled to an output terminal 208 by means of the usual center tapped output transformer, represented in the diagram by the numeral 209. Specifically, it is this push-pull output stage which is gated on by pulses derived from the load circuit of diode section 108 by way of a pair of resistors 211 and 212 connected to the respective control electrodes of triode sections 206 and 207.

Finally, there are adapted to be connected between resistors 211, 212 and ground, by means of a switch 121, a selected one of a pair of integrating circuits 122 and 123. These latter circuits control the decay time of the signals obtained at the output terminal 208 as a function of the triggering signals applied to the terminals 100—100′. As shown, switch 121 has a neutral position whereby both of the integrating circuits 122 and 123 can be disabled, in which case the decay time is at a minimum. Also there is a switch 120 optionally for applying the output of the parallel rectifier circuit including diodes 103, 104 directly to the push-pull output stage so as to obtain an envelope shaping type control of the output signal amplitude.

In operation it is the function of the play-back heads 17—19 and their associated switching circuitries to provide a selected reverberation pattern of music or tone signals applied to the system by way of input terminal 24. Conversely, it is the function of circuits 51, 52 and 56—59 and their associated switching circuitries to determine the nature of the reverberations signals, and hence the way they sound. A simple example of an effect that can be achieved with the apparatus according to the invention will serve to illustrate the general principle. Thus, let it be assumed that the signals applied to input terminal 24 are obtained from an electronic organ (not shown), and that the various switches incorporated in the apparatus have been positioned as shown. In this case, audio signals from terminal 24 will first be applied directly to line A by way of pre-amplifier 36 and simultaneously recorded on the tape by record head 15. At a slightly later time determined by the speed of the tape and the spacing of the play-back heads from the record head, the signals will be detected by play-back head 17 and applied to line B. Similarly play-back head 18 will transmit the signals to line A after another delay of corresponding duration, and play-back head 19 will transmit them to line B after still another delay.

The signals on lines A and B next pass through the respective output amplifiers 37 and 38, whereupon they are separately acted upon by the format circuits 51 and 52. Finally, the singals are combined in mixer 57, the output being derived from terminal 84, the output terminal for the mixer. Format circuits 51 and 52 serve to modify the harmonic content of the signals so that they will sound differently, the type of formant circuits used, of course, being a matter of choice depending upon the way it is desired to modify the signals. Such formant circuits are well known to those skilled in the art and the particular type used is not at all material to the principles of the present invention. What is significant is the fact that alternate reverberations sound the same but successive reverberations sound differently, thereby forming a reverberation pattern which may be designated ABAB. By altering the positions of the switches 31—33, this pattern can be changed to ABBA AABB and so forth. By the provision of additional playback heads and formant circuits, it is of course possible to increase the number and complexity of the patterns obtainable as desired.

Still another example of the operation of the apparatus might be as follows. Signals representing bongo drums played through a microphone are applied to input terminal 54 for the formant circuit 51 and input terminal 63 for the gate 56. From terminal 54 the signals are transmitted by formant circuit 51 in modified form to one of the inputs of mixer 57. In addition, the signals are used to trigger output signals derived from electric organ which in this example are applied to input terminal 62 for the gate. As described in the foregoing, gate 56 serves to reproduce the organ signals in staccato form corresponding to the rhythm of the bongo drums. As thus modified, the organ signals are transmitted to the mixer where they are combined with the bongo signals themselves as modified by formant circuit 51. From the mixer, the signals are transmitted to input terminal 24, whereupon the same reverberation effect as described in connection with the first example is produced by means of the play-back heads 17—19. In this example, however, switch 39 is closed as no further modifications of the signals are introduced and the output product consisting of the formant modified bongo drums and the triggered organ is obtained from either of output terminals A′ or B′.

Those skilled in the art will appreciate that the number and types of switches that are employed in the apparatus according to the invention may be varied considerably and that other types of signal modifying circuitries such as a vibrato frequency generator, for example, can be readily incorporated in the apparatus. Similarly instead of a tape loop, it would of course be possible to achieve the same general effect with a continuous tape transport mechanism. Therefore, the invention should not be deemed to be limited to the details of what has been described herein by way of example, but rather it should be deemed to be limited only to the scope of the appended claims.

What is claimed is:

1. Electronic apparatus for producing special effects upon audio signals, said apparatus comprising a record medium having at least one track on which signals may be recorded, means to drive said record medium to move said track through a predetermined path, a record head disposed adjacent said path for the recording of said signals upon said track, a plurality of play back heads disposed at spaced locations along said path for the sensing of the signals recorded on said track, at least a pair of signal transmission channels, each channel including a sound processing and voicing network having characteristics distinctly different from the sound processing and voicing network in each other channel means to apply all the signals sensed by said playback heads to said transmission channels including switch means for applying the signals from said playback heads to said channels in a selected pattern, and means to combine signals from both said channels and apply the combined signals on a single output line for reproduction in audible form.

2. Electronic apparatus for producing special effects upon audio signals, said apparatus comprising a record medium having at least one track on which signals may be recorded, means to drive said record medium to move said track through a predetermined path, a record head disposed adjacent said path for the recording of said signals upon said track, a plurality of play back heads disposed at spaced locations along said path for the sensing of the signals recorded on said track, means to feed back signals to said record head, first switch means to couple a selected one of said playback heads to said feedback means, at least a pair of signal transmission channels, a plurality of signal modifying networks having respectively different sound processing and voicing characteristics, second switch means to couple selected ones of said networks to one end of each of said transmission channels, third switch means selectively to couple said playback heads to the other end of each of said transmission channels, and a mixer connected to said networks to combine for reproduction in audible form, signals from said modifying networks transmitted by way of both said channels.

3. Electronic apparatus for producing special effects upon audio signals, said apparatus comprising an endless magnetic tape on which signals may be recorded, a tape transport mechanism to move said tape through a closed path, a record head for the recording of said signals upon said tape, an erase head disposed ahead of said record head to obliterate signals having been recorded on the tape, a plurality of play back heads disposed at spaced locations along said path in back of said record head for the sensing of the signals recorded on said tape, means to feed back signals to said record head, first switch means to couple a selected one of said playback heads to said feedback means, at least a pair of signal transmission channels, a plurality of signal modifying networks having respectively different sound processing and voicing characteristics, second switch means to couple selected ones of said networks to one end of each of said transmission channels, third switch means selectively to couple said playback heads to the other end of each of said transmission channels, and a mixer connected to said networks to combine for reproduction in audible form signals from said modifying networks transmitted by way of both said channels.

4. Electronic apparatus for producing special effects upon audio signals, said apparatus comprising an endless magnetic tape on which signals may be recorded, a tape transport mechanism to move said tape through a closed path, a record head for the recording of said signals upon said tape, an erase head disposed ahead of said record head to obliterate signals having been recorded on the tape, a plurality of play back heads disposed at spaced locations along said path in back of said record head for the sensing of the signals recorded on said tape, means to feed back signals to said record head, first switch means to couple a selected one of said playback heads to said feedback means, at least a pair of signal transmission channels, a plurality of signal modifying networks having respectively different sound processing and voicing characteristics, second switch means to couple selected ones of said networks to one end of each of said transmission channels, third switch means selectively to couple said playback heads to the other end of each of said transmission channels, fourth switch means to apply unrecorded signals to said other end of a selected one of said transmission channels, fifth switch means to couple a selected one of said networks to said record head, and a mixer connected to said network to combine for reproduction in audible form signals from said modifying networks transmitted by way of both said channels.

5. Electronic apparatus for producing special effects upon audio signals, said apparatus comprising an endless magnetic tape on which signals may be recorded, a tape transport mechanism to move said tape through a closed path, a record head for the recording of said signals upon said tape, an erase head disposed ahead of said record head to obliterate signals having been recorded on the tape, a plurality of play back heads disposed at spaced locations along said path in back of said record head for the sensing of the signals recorded on said tape, means to feed back signals to said record head, first switch means to couple a selected one of said playback heads to said feedback means, at least a pair of signal transmission channels, a plurality of signal modifying networks having respectively different sound processing and voicing characteristics, second switch means to couple selected ones of said networks to one end of each of said transmission channels, third switch means selectively to couple said playback heads to the other end of each of said transmission channels, a mixer connected to said networks to combine for reproduction in audible form, signals from said modifying networks transmitted by way of both said channels, an audio triggered gate having a pair of input circuits and an output circuit, means to apply audio signals to be modified to said input circuits, fourth switch means to couple said output circuit to a selected one of said modifying networks and said mixer, and fifth switch means to couple said mixer to said record head.

6. Electronic apparatus for synthesizing an audio signal from a plurality of different input audio signals, said apparatus comprising a plurality of audio signal modifying networks, each said network having sound processing and voicing characteristics different from those of the other networks, means to apply different audio signals to each said network, mixer means connected to said networks to provide a combined signal as a function of the signals from said modifying networks, a record medium having at least one track on which signals may be recorded, means to drive said record medium to move said track through a predetermined path, a record head disposed adjacent said path for recording said combined signal on said track, a plurality of playback heads disposed at spaced locations from said record head along said path for the sensing of signals recorded on said track, and means to combine the signals provided by said playback heads to provide an output signal for reproduction in audible form having a reverberation pattern that is a function of the spacing of said playback heads from said record head.

References Cited in the file of this patent

UNITED STATES PATENTS

| | | |
|---|---|---|
| 2,767,254 | Lafferty | Oct. 16, 1956 |
| 2,941,044 | Volkmann | June 14, 1960 |
| 2,942,070 | Hammond | June 21, 1960 |

FOREIGN PATENTS

| | | |
|---|---|---|
| 564,517 | Belgium | Oct. 4, 1958 |